US009311814B2

(12) United States Patent
Hayes et al.

(10) Patent No.: US 9,311,814 B2
(45) Date of Patent: *Apr. 12, 2016

(54) SYSTEM AND METHOD FOR AUTOMATICALLY SETTING UP A UNIVERSAL REMOTE CONTROL

(71) Applicant: UNIVERSAL ELECTRONICS INC., Santa Ana, CA (US)

(72) Inventors: Patrick H. Hayes, Mission Viejo, CA (US); James N. Conway, Jr., Laguna Beach, CA (US); Robert P. Lilleness, Seattle, WA (US); Paul D. Arling, Irvine, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 14/314,224

(22) Filed: Jun. 25, 2014

(65) Prior Publication Data

US 2015/0054631 A1 Feb. 26, 2015

Related U.S. Application Data

(63) Continuation-in-part of application No. 11/818,295, filed on Jun. 14, 2007, which is a continuation of application No. 10/665,642, filed on Sep. 19, 2003, now Pat. No. 7,586,398, which is a continuation-in-part of application No. 10/151,635, filed on May 20, 2002, now Pat. No. 7,218,243, which (Continued)

(51) Int. Cl.
*G08C 17/02* (2006.01)

(52) U.S. Cl.
CPC ............ *G08C 17/02* (2013.01); *G08C 2201/20* (2013.01)

(58) Field of Classification Search
CPC ........... G08C 2201/21; G08C 2201/92; G08C 17/02; H04L 12/2803
USPC ..................................... 340/12.28, 12.3, 176
See application file for complete search history.

(56) References Cited

U.S. PATENT DOCUMENTS 7,218,243 B2* 5/2007 Hayes et al. ............... 340/12.25
2002/0140569 A1* 10/2002 van Ee et al. ............ 340/825.69

*Primary Examiner* — Edwin Holloway, III
(74) *Attorney, Agent, or Firm* — Greenberg Traurig, LLP

(57) ABSTRACT

A system and method for configuring a remote control to command the operation of appliances, to capture demographic data, and to provide services, such as automated warranty registration, instructions, viewing guides, etc., relevant to the appliances is provided. The system includes a database and associated server that are located remotely from the remote control and accessible via a network connection. Command codes, graphical user interface elements, and services are accessed and downloaded to the remote control, as appropriate, using data supplied to the server that identifies the appliances and/or functional capabilities of the appliances. This data can be supplied by the appliances directly or can be obtained from other sources such as barcode labels, network devices, etc.

24 Claims, 17 Drawing Sheets

Related U.S. Application Data is a continuation-in-part of application No. 09/615,473, filed on Jul. 13, 2000, now Pat. No. 8,098,140, and a continuation-in-part of application No. 09/334,584, filed on Jun. 16, 1999, now Pat. No. 6,781,518, which is a continuation-in-part of application No. 09/121,229, filed on Jul. 23, 1998, now Pat. No. 6,157,319, which is a continuation-in-part of application No. 09/905,423, filed on Jul. 13, 2001, which is a continuation-in-part of application No. 10/288,727, filed on Nov. 6, 2002, now Pat. No. 7,831,930.

(60) Provisional application No. 60/264,767, filed on Jan. 29, 2001, provisional application No. 60/344,020, filed on Dec. 20, 2001, provisional application No. 60/334,774, filed on Nov. 20, 2001.

| DEVICE TYPE: TV | | DEVICE TYPE: VCR | |
|---|---|---|---|
| # | Function | # | Function |
| 1 | Power | 1 | Power |
| 2 | Volume up | 2 | Play |
| 3 | Volume down | 3 | Stop |
| 4 | Mute | 4 | Fast forward |
| 5 | Channel up | 5 | Rewind |
| 6 | Channel down | 6 | Pause |
| 7 | 0 | 7 | Record |
| 8 | 1 | 8 | Slow+ |
| 9 | 2 | 9 | Slow— |
| 10 | 3 | 10 | Frame advance |
| 11 | 4 | 11 | Tracking+ |
| 12 | 5 | 12 | Tracking— |
| 13 | 6 | 13 | Index search forward |
| 14 | 7 | 14 | Index search reverse |
| 15 | 8 | 15 | Stereo/mono |
| 16 | 9 | 16 | Channel+ |
| 17 | 0 | 17 | Channel— |

FUNCTION IDENTIFIERS FOR TV AND VCR DEVICES

FIG. 8A

| DEVICE TYPE: TV | | DEVICE TYPE: VCR | |
|---|---|---|---|
| # | Function | # | Function |
| 18 | Enter | 18 | 1 |
| 19 | Previous channel | 19 | 2 |
| 20 | Input select | 20 | 3 |
| 21 | Menu | 21 | 4 |
| 22 | Menu up | 22 | 5 |
| 23 | Menu down | 23 | 6 |
| 24 | Menu left | 24 | 7 |
| 25 | Menu right | 25 | 8 |
| 26 | Select | 26 | 9 |
| 27 | Exit | 27 | 0 |
| 28 | Closed caption on/off | 28 | Enter |
| 29 | Sleep timer | 29 | TV/VCR |
| 30 | Brightness+ | 30 | Menu |
| 31 | Brightness− | 31 | Menu up |
| 32 | Tint+ | 32 | Menu down |
| 33 | Tint− | 33 | Menu left |
| 34 | Surround on/off | 34 | Menu right |
| 35 | Rear vol+ | 35 | Select |
| 36 | Rear vol− | 36 | Volume+ |
| 37 | Center vol+ | 37 | Volume− |
| 38 | Center vol− | 38 | Mute |
| 39 | Favorite channel+ | 39 | VCR plus |
| 40 | Favorite channel− | 40 | Program |
| 41 | +100 | 41 | ... |
| 42 | Displat on/off | 42 | ... |
| 43 | ... | 43 | ... |
| ... | Etc. | ... | Etc. |

FUNCTION IDENTIFIERS FOR TV AND VCR DEVICES

FIG. 8B

| # | DEVICE TYPE: TV | # | DEVICE TYPE: VCR |
|---|---|---|---|
|   | Function |   |   |
| 1 | Power | 1 | Power |
| 2 | Volume+/− & Mute | 2 | Transport: Play/stop/FF/REW/Pause |
| 3 | Channel+/− | 3 | Record |
| 4 | Digit group 0 through 9 | 4 | Slow adjust |
| 5 | Enter | 5 | Frame advance |
| 6 | Channel down | 6 | Tracking adjust |
| 7 | Previous channel | 7 | Index search forward |
| 8 | Input select | 8 | Index search reverse |
| 9 | Menu on | 9 | Stereo/mono |
| 10 | Menu navigation: up/dwn/left/right | 10 | Channel+/− |
| 11 | Select | 11 | Digital group 0 through 9 |
| 12 | Exit | 12 | Enter |
| 13 | Closed caption on/off | 13 | TV/VCR |
| 14 | Sleep timer | 14 | Menu on |
| 15 | Brightness adjust | 15 | Menu navigation: up/dwn/left/right |
| 16 | Tint adjust | 16 | Select |
| 17 | Surround on/off | 17 | Volume+/− & Mute |
| 18 | Rear volume+/− | 18 | VCR plus |
| 19 | Center volume+/− | 19 | Program |
| 20 | Favorite channel+/− | 20 | ... |
| 21 | +100 | 21 | ... |
| 22 | Display on/off | 22 | ... |
| 23 | ... | 23 | ... |
| 24 | Etc. | 24 | Etc. |

TV AND VCR FUNCTIONS—COMPACT REPRESENTATION

FIG. 9

| "00" | Flag indicating that the following data is a new function definition |
|---|---|
| "xx" | Count of how many bytes of definition information follow |
| "yyyyyy" | Definition of IR code to be sent, using, for example, the three digit function synthesis format described in U.S. Patent 5,515,052. Note that this value is in ASCII or similar representation to avoid itself including a "00" byte. |
| "zzzz....zz" | (Optional) Text label for the new function, if the remote has the capability to display this. |

NEW FUNCTION DEFINITION DATA BLOCK

FIG. 11

FCD"01,02"

FCD"01,02,03,10,11"

FCD"01,02,03,04,05,10,11"

FCD"01,02,00,11,39,38,31,78,
84,83,67,47,80,65,76"

SYSTEM AND METHOD FOR AUTOMATICALLY SETTING UP A UNIVERSAL REMOTE CONTROL

RELATED APPLICATIONS

This application claims the benefit of and is a continuation-in-part of U.S. application Ser. No. 11/818,295, filed on Jun. 14, 2007, which claims the benefit of and is a continuation of U.S. application Ser. No. 10/665,642, filed on Sep. 19, 2003, which claims the benefit of and is a continuation-in-part of U.S. application Ser. No. 10/151,635, filed on May 20, 2002, which claims the benefit of is a continuation-in-part of U.S. application Ser. No. 09/615,473, filed on Jul. 13, 2000, and U.S. application Ser. No. 09/334,584, filed on Jun. 16, 1999, which, in turn, claims the benefit of and is a continuation-in-part of U.S. application Ser. No. 09/121,229, filed on Jul. 23, 1998, and claims the benefit of and is a continuation-in-part of U.S. application Ser. No. 09/905,423, filed on Jul. 13, 2001, which, in turn, claims the benefit of U.S. Provisional Application No. 60/264,767, filed on Jan. 29, 2001.

BACKGROUND

This invention relates generally to remote controls and, more particularly, to a system and method for automatically setting up a universal remote control to control the operation of one or more devices.

Universal remote controls used to control the operations of a number of various types of devices such as televisions, video cassette recorders (VCRs), cable boxes, disk players, digital video recorders (DVRs), thermostats, fans, HVAC equipment, etc. are known in the art. Examples of such remote controls can be seen in commonly assigned U.S. Pat. Nos. 5,255,313 and 5,552,917. In one method of setting up a universal remote control to communicate with a given device, command codes are manually learned from a remote control provided by the manufacturer of the given device (U.S. Pat. No. 4,623,887). In other methods of setting up a universal remote control, a user manually configures the universal remote control to select appropriate command codes from a command code library (U.S. Pat. Nos. 5,872,562, 5,614,906, 4,959,810, 4,774,511, and 4,703,359). These methods for manually setting up a universal remote control, however, have the problem of being demanding, exacting and generally frustrating for many users.

SUMMARY

To overcome this and other problems, a system and method for configuring a remote control to command the operation of appliances, to capture demographic data, and to provide services, such as automated warranty registration, instructions, viewing guides, etc., relevant to the appliances is provided. The system includes a database and associated server that are located remotely from the remote control and accessible via a network connection. Command codes, graphical user interface elements, and services are accessed and downloaded to the remote control, as appropriate, using data supplied to the server that identifies the appliances and/or functional capabilities of the appliances. This data can be supplied by the appliances directly or can be obtained from other sources such as barcode labels, network devices, etc.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which:

FIGS. 8A and 8B illustrate exemplary listings of functions for a TV and VCR, respectively;

FIG. 9 illustrates an exemplary listing of functions grouped to provide a compact version of the respective functions;

FIG. 11 illustrates an exemplary table showing reserved numbering for indicating a new function;

DETAILED DESCRIPTION

Figure 1:
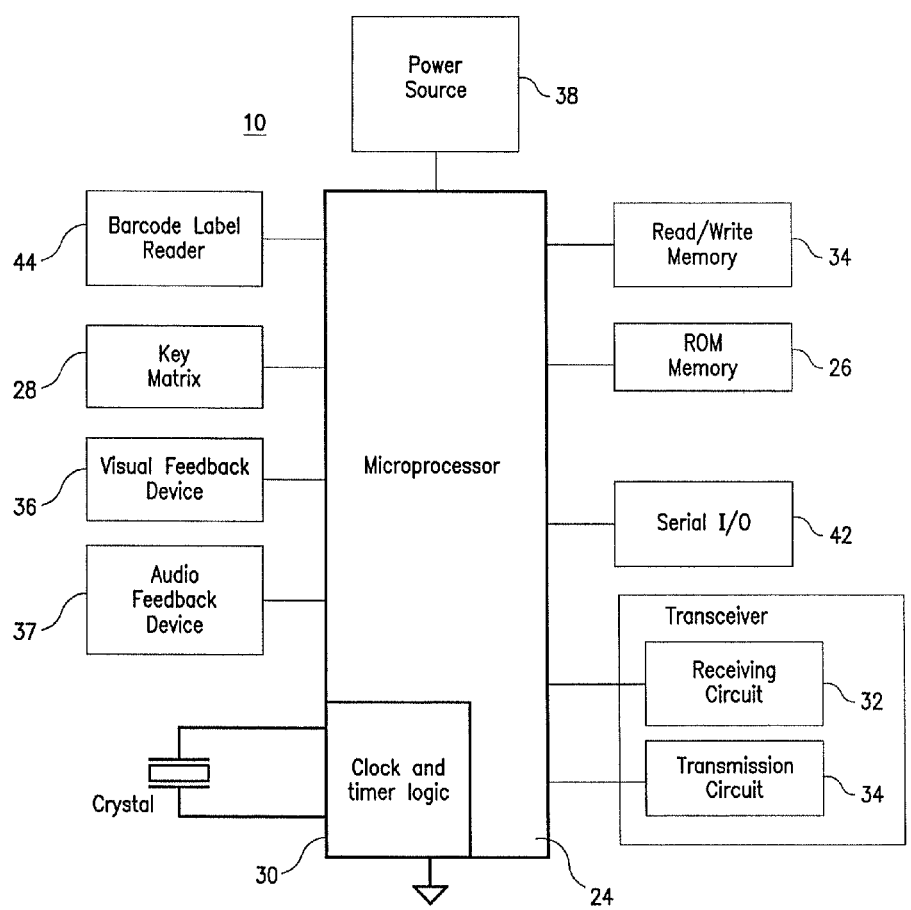
FIG. 1 is a block diagram view of an exemplary remote control.

Turning now to the figures, wherein like reference numerals refer to like elements, exemplary systems and methods for setting up a remote control to control the operation of one or more devices are illustrated and described. The remote control may additionally be adapted to display information related to the operation of the one or more devices. In this regard, the devices can include, but are not limited to, televisions, VCRs, DVRs, DVD players, cable converter boxes, amplifiers, CD players, game consoles, home lighting, drapery, fans, HVAC systems, thermostats, personal computers, etc.

To perform these and other functions, the remote control 10 may include, as needed for a particular application, a processor 24 coupled to a ROM memory 26, a key matrix 28 (e.g., physical buttons, a touch screen display, or a combination thereof), an internal clock and timer 30, transmission circuit(s) 32, receiver circuit(s) 33 and/or transceiver circuit(s) (e.g., IR and/or RF), a non-volatile read/write memory 34, a means 36 to provide visual feedback to the user (e.g, LED, display, and/or the like), means 37 to provide audio feedback to the user (e.g., a speaker), a power supply 38, serial I/O port 42 (e.g., a jack or contacts), and a bar code scanner 44, as illustrated in FIG. 1. As will be understood by those of skill in the art, the ROM memory 26 includes executable instructions that are intended to be executed by the processor 24 to control the operation of the remote control 10.

In this manner, the processor 24 may be programmed to control the various electronic components within the remote control 10, e.g., to monitor the power supply 38, to cause the transmission of signals, display icons and/or HTML pages, etc. The non-volatile read/write memory 34, for example an EEPROM, battery-backed up RAM, Smart Card, memory stick, or the like, is provided to store setup data and parameters as necessary. While the memory 26 is illustrated and described as a ROM memory, memory 26 can also be comprised of any type of readable media, such as ROM, RAM, SRAM, FLASH, EEPROM, or the like. Preferably, the memory 26 is non-volatile or battery-backed such that data is not required to be reloaded after battery changes. In addition, the memories 26 and 34 may take the form of a chip, a hard disk, a magnetic disk, and/or an optical disk.

To cause the remote control 10 to perform an action, the remote control 10 is adapted to be responsive to events, such as a sensed user interaction with the key matrix 28, receipt of a transmission, etc. In response to an event appropriate instructions within the memory 26 are executed. For example, when a command key is activated on the remote control 10, the remote control 10 may retrieve a command code corresponding to the activated command key from memory 26 and transmit the command code to a device in a format recognizable by the device. It will be appreciated that the instructions within the memory 26 can be used not only to cause the transmission of command codes and/or data to the devices but also to perform local operations. While not limiting, local operations that may be performed by the remote control 10 include displaying information/data, favorite channel setup, macro button setup, command function key relocation, etc. Since examples of local operations can be found in U.S. Pat. Nos. 5,481,256, 5,959,751, and 6,014,092 they will not be discussed in greater detail herein.

Additional examples of remote controls 10 may be found in commonly owned, U.S. Pat. No. 6,225,938 and U.S. application Ser. Nos. 60/264,767, 09/905,423, 09/905,432, and Ser. No. 09/905,396.

Figure 2:
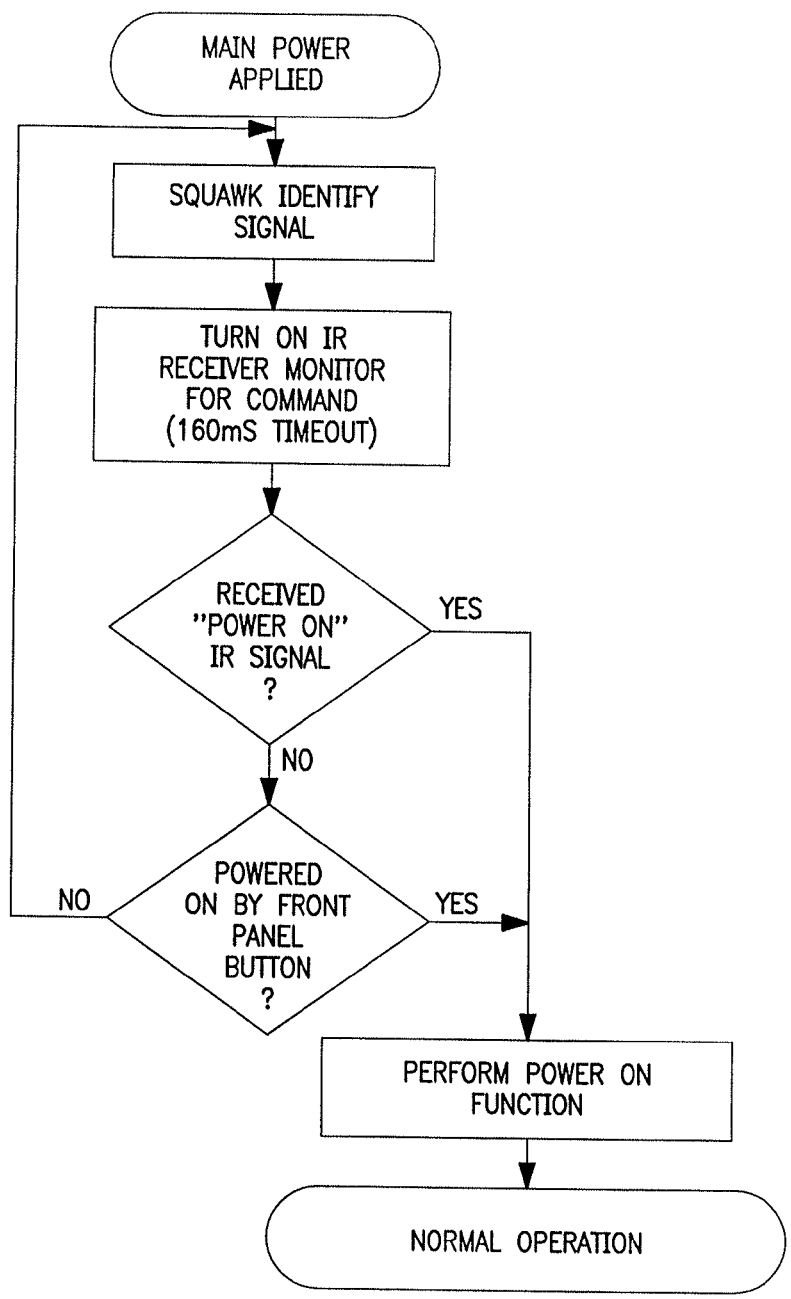
FIG. 2 is a flow chart diagram of an exemplary method for sending a setup signal to the remote control.

In one method for setting up the remote control 10 to communicate with a device, the remote control 10 and the device are provided with Device Activated Setup (hereinafter "DAS") capabilities. Generally, in accordance with this method and as illustrated in FIG. 2, the DAS setup procedure may commence when the device is first plugged in which, in turn, causes the device to emit a DAS squawk signal. After transmitting the squawk signal, the device may monitor for a command, e.g., power on, transmitted from the remote control 10. If the device receives the command from the remote control 10, it may perform a function in accordance with the received command and, furthermore, cease the transmission of the squawk signal. If the device does not receive a command from the remote control 10, the device may check to see if a command has been received via its front panel and, if so, the device may perform the function corresponding to the entered command and, furthermore, cease transmission of the squawk signal. If the device does not receive a command via its front panel or via a remote control transmission, the device may continue to repeat this squawk process. Alternatively, the device need not check for the receipt of a command code but may be adapted to merely transmit the squawk signal a predetermined number of times or over a predetermined time duration before ceasing the transmission of the squawk signal. It should be appreciated that the sending of the squawk signal can also be initiated in response to the operation of one or more keys on the front panel of the device. Generally, the squawk signal includes data that functions to identify: a) the device type; and b) the remote control encoding format to which the device responds. The remote control encoding format to which the device responds could be indicated by data that is representative of the manufacturer (and sometime model number) of the device.

Figure 3:
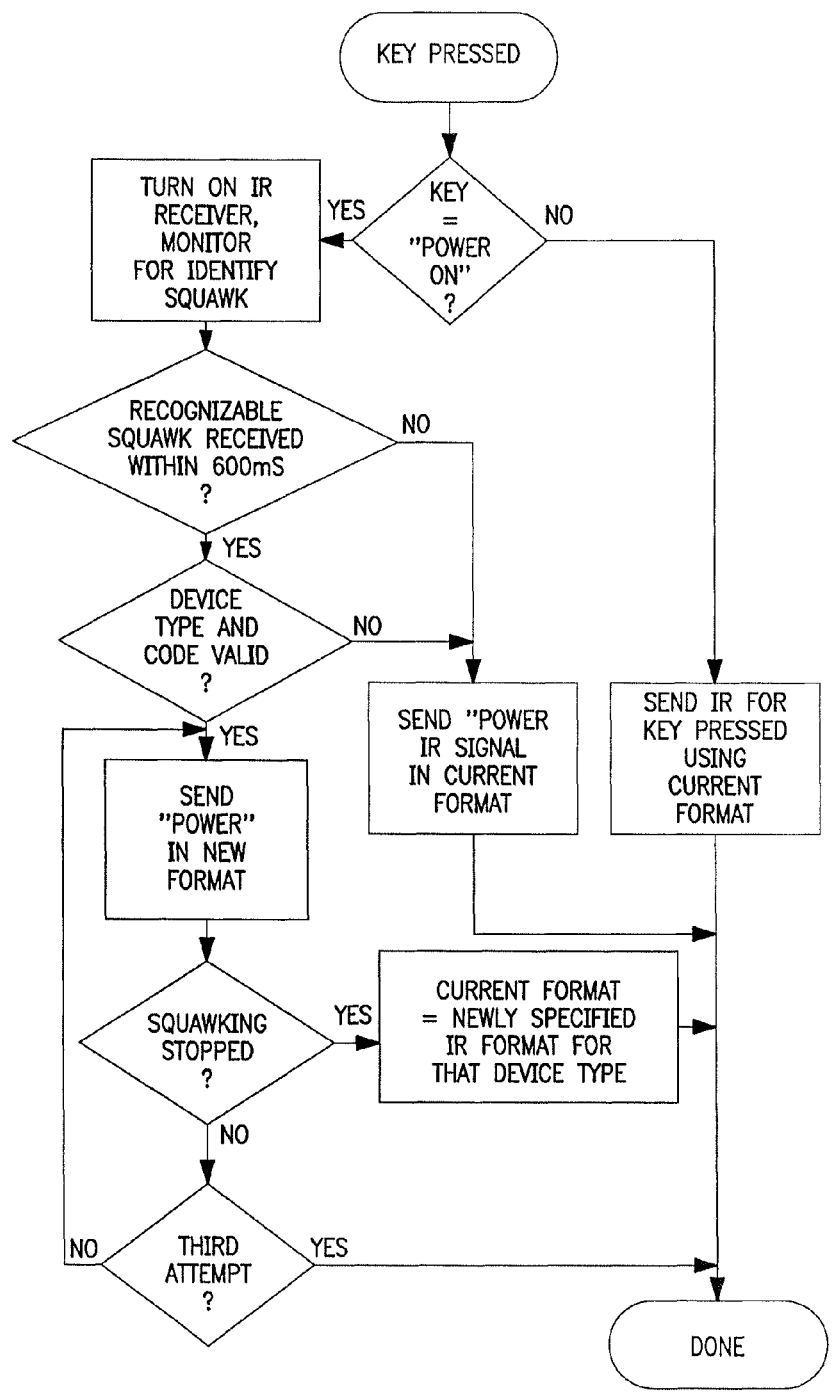
FIG. 3 is a flow chart diagram of an exemplary setup method.

To setup the remote control 10, as illustrated in FIG. 3, a key on the remote control 10 can be actuated to generate an event which causes the processor 24 to place the remote control 10 in a receive mode to listen for a transmitted squawk signal. The actuation of the remote control 10 setup procedure can result from a predefined key depression/event or any key activation/event without limitation. If the remote control 10 detects a recognizable squawk signal, it proceeds to analyze the identification data embedded within the squawk signal. If the device type and requested transmission format are supported by the remote control 10, the processor 24 can commence executing a sequence of instructions to select those command codes from a command code library that will appropriately command operations of the squawking device. In addition, the remote control 10 may send one of the selected command codes to the squawking device for the purpose of acknowledging receipt of the squawk signal and ending the squawking procedure at the device. Thus, in this manner, the remote control unit 10 may be setup to communicate with the device. If the data in the squawk signal is not recognized by the remote control 10, i.e., communications with the device are not supported by the remote control 10, the remote control 10 may simply remain unchanged and continue to use its previous setup configuration. Alternatively, if the remote control 10 does not support communications with the device, the remote control 10 may access, as described hereinafter, a remote data repository to attempt to download configuration data that will allow the remote control 10 to be used to communicate with the device.

In a standard universal remote control, the user is often required to setup the remote control by: 1) looking up a designation number for a device in a code list supplied with the remote control; and 2) manually entering the looked-up designation number into the remote control. As becomes clear from the foregoing explanation, the squawk signal of the described system allows a device to automatically supply this designation number, or like type of designation information, to the remote control 10.

Figure 4A:
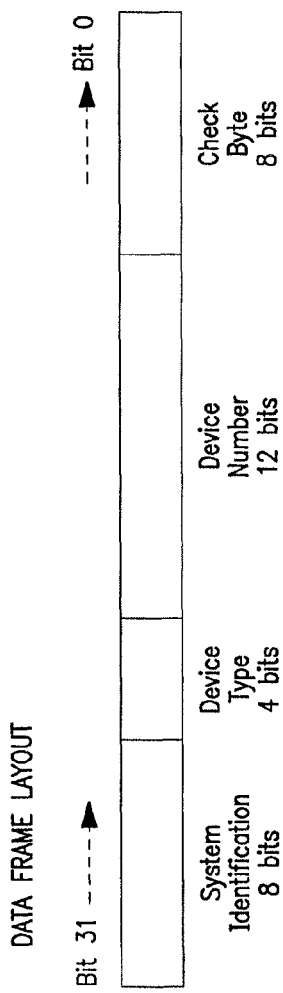
FIGS. 4A and 4B illustrate exemplary setup signal data frames.

An exemplary data frame layout of a squawk signal is illustrated in FIG. 4a. In this regard, the data content of the squawk signal can be a 32 bit value having the following data fields:

Data field one—8 bits used as a system identification to allow multiple versions of the system to co-exist without interfering with one another's settings.

Data field two—4 bits used to identify a device type category such as, by way of example:

| | |
|---|---|
| 00 TV | 08 CD player |
| 01 VCR | 09 Amplifier |
| 02 Cassette tape | 10 Tuner |
| 03 Laser disk | 11 Home automation |
| 04 Digital audio tape | 12 Misc. audio |
| 05 Cable box | 13 Phonograph |
| 06 Satellite IRD | 14 DVD |
| 07 Video Accessory | 15 Spare. |

Data field three—12 bits used to indicate a device designation number (e.g., a setup code usually indicative of the manufacturer and sometimes model number of the device).

Data field four—8 bits used as a check sum byte (e.g., longitudinal parity of the preceding three bytes).

The data may be transmitted, most significant bit first, using a burst duration modulation scheme as follows:

| | |
|---|---|
| Encoding: | Burst duration modulation using amplitude shift keyed IR subcarrier. |
| Subcarrier: | 40 KHz |
| Bit encoding: | Basic time interval is t = 500 us (20 cycles of subcarrier). Burst times (nominal) are t and 2t. Gap times (nominal) are t and 2t. |
| Frame format: | Bits per frame: 32<br>Preamble burst: 4.0 mS (8t)<br>Preamble gap: 4.0 mS (8t) |
| Interframe gap: | 150 MS minimum |

Figure 5:
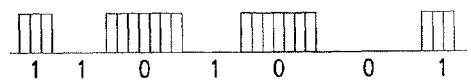
FIG. 5 illustrates an exemplary setup signal bit pattern.

The encoded data stream may consist of alternating intervals of carrier and no carrier. The duration of each interval signals the value of the bit corresponding to that location. Ones are represented by short intervals, zeros are represented by long intervals. An example of the bit pattern for "1101001" may thus be encoded as shown in FIG. 5. The data frame layout is shown in FIG. 4a. Each data frame may be preceded by a preamble (pre) burst which consists of 4.0 mS of constant carrier, followed by a 4.0 mS gap that is followed, in turn, by a inter-frame gap of 150 mS during which time the transmitting device may monitor for a command transmitted in the format indicated by the data in the squawk signal. Note that the device can provide squawk signals alternating between a number of different device designation numbers if it is capable of supporting multiple transmission formats. It is to be appreciated that this encoding format is one implementation but other encoding schemes can be used to achieve the same result.

Figure 4B:
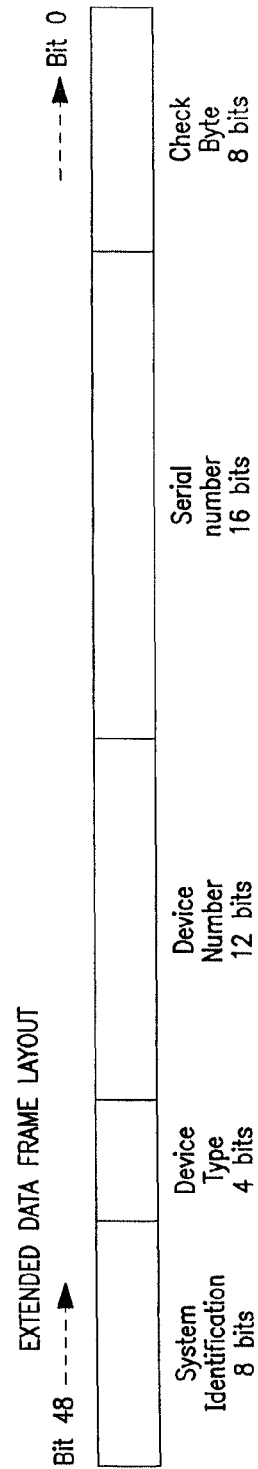

It will also be appreciated that the data payload may be extended to include additional information, e.g. appliance model or serial numbers where such information would be of use. As needed, appropriate adjustments may be made to frame timings, etc. to accommodate this additional data. By way of example, FIG. 4(b) illustrates a case where the data frame is extended to 48 bits to include an additional 16-bit field containing a unit serial number for use in automated warranty registration as will be described in more detail hereinafter. Other data formats and field assignments are also possible.

Figure 6:
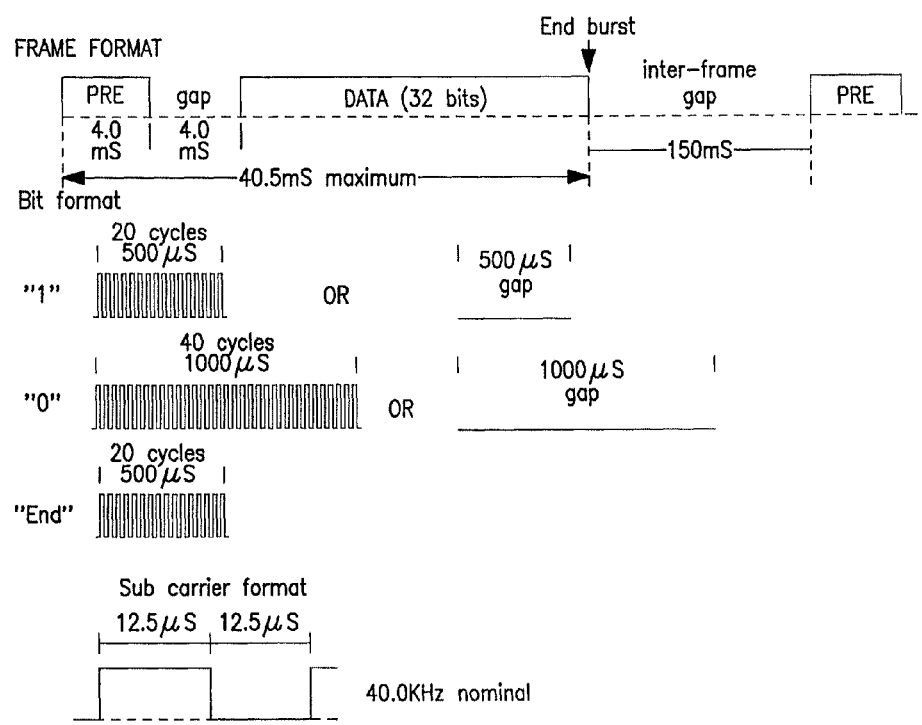
FIG. 6 illustrates an exemplary setup signal frame format, bit format and subcarrier format using a burst-type modulation.

As is shown in FIG. 6, in the bit encoding scheme used, the minimum frame time (including the preamble burst) is 24.5 mS, while the maximum frame time is 40.5 mS. The exact time is dependent on the particular mixture of ones and zeros being sent. After sending a squawk signal, the device may enable its receiver and monitor for a transmitted command. If no command is detected after 150 mS of monitoring, the device may repeat this pattern. Since the majority of remote control transmission formats use a frame repetition rate equal to or less than 120 mS, the 150 mS monitoring time is adequate to allow a standard (non-universal) remote control shipped with the system to initiate a command transmission and cause the device to exit the squawking procedure.

As discussed previously, upon the occurrence of the setup event, the remote control 10 enables its receiver for approximately 600 mS and monitors for a valid squawk signal. Since the squawk is repeated at least once every 190 mS, there will be at least three opportunities to decode a valid squawk signal during this time interval. If no squawk is detected, or if a squawk is detected but specifies an unknown setup number (i.e., device type or manufacturer not supported by the built-in database of the remote control 10), the remote control 10 may simply continue to process events using its current configuration or, alternatively, the remote control 10 may initiate access to a remote data repository and attempt to download the remote control user interface and signaling information that corresponds to the setup number provided by the device. The remote control 10 may also store the data in the squawk signal for uploading to an intermediate, client device. The client device may then use this data to download the an appropriate user interface and signaling information or subsequent, off-line downloading to the remote control 10. If, however, a valid squawk signal is detected, the remote control 110 may respond by sending a command to the device in the requested format, commencing during the 150 mS interframe interval, to suspend the squawk procedure at the device.

The remote control 10, after sending a command to the device, may continue to monitor to confirm that the transmission of squawk signals from the device has ceased. If the transmission of squawk signals has ceased (indicating that the device received and recognized the transmitted command), the remote control 10 may then set itself to use the communications format/command codes specified within the squawk signal when transmitting communications/commands to the device. If the transmission of squawk signals has not ceased, the remote control 10 may then sequence twice more before abandoning the attempt and exiting setup with its current settings unchanged.

In yet another embodiment, in situations where the user has a device that does not include DAS, a personal computer, set top box, or the like could have the capability of performing the function of setting up the remote control 10. In such a case, the personal computer or set top box can be used to transmit a squawk signal having the requisite information to setup the remote control 10 using one or more of the various procedures described herein. The data content and signaling format for the squawk signal may obtained from local data storage or from a remote data repository, and selection of the specific squawk to be transmitted could be via user entry of a brand and model number, a UPC code, other text-based identifying information, or by a user visually scanning a database containing pictures or other identifying characteristics of device brands and models.

While the above described exemplary methods are particularly adapted for use with current consumer appliances which are generally equipped to communicate using infrared (IR) signals, it is to be understood that the concepts expressed may be applied to devices which communicate using radio frequency (RF), including but not limited to those supporting various emerging standards such as Bluetooth, HomeRF, IEE 802.11, etc.

In connection with the DAS method described above, a function configuration process could also be implemented. The function configuration process, generally illustrated in FIG. 7, may be used to setup function identity and operating parameters within the remote control 10. Typically, this would occur after the DAS information was used to setup the remote control 10 to use the command codes/communication format appropriate for the device. For each type of device to be controlled, a set of possible functions is defined and each function is assigned a unique numeric identifier which is communicated to the remote control 10. In an exemplary implementation, up to 256 possible numeric identifiers can be used.

By way of example, two sets of function identifiers are shown in FIGS. 8a and 8b for a TV and a VCR device, respectively. Similar tables may be constructed for each additional device type to be controlled. It is to be understood that the number identifiers in the tables of FIGS. 8a and 8b do not themselves define what signal is to be sent to the controlled (target) device to effect the function; the numbers simply indicate to the remote control 10 which functions a particular device supports.

The tables of FIGS. 8a and 8b include several groups of functions which could reasonably be expected to be supported by the respective devices. Additionally, the groups often comprise families of related functions. For example, the family comprising "Volume Up" and "Volume Down," and the family comprising "Play" and "Stop," could both be included as a group. From the teachings herein it will be understood that the family relationship may be defined in terms of a functional relationship, such as audio control; an entertainment relationship, such as audio control of source "a" and image control of source "b" and signal selection control of source "c;" a device relationship, such as VCR or Digital Satellite; as well as a task optimized or a user defined relationship. Other families and groupings will be apparent to those of skill in the art. FIG. 9 demonstrates that grouping such functions under a single designator results in a more compact representation, or table. While both representations can be used effectively, the compact version of FIG. 9 is preferred.

Figure 10A:
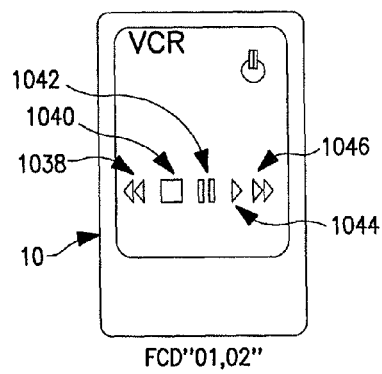
FIGS. 10A, 10B, 10C, and 10D illustrate exemplary touch screen displays for four example device codes and resulting Graphical User Interfaces on the remote control.
Figure 10B:
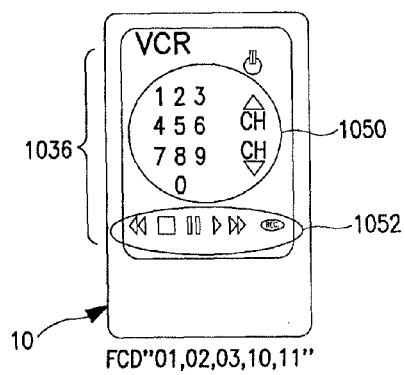
Figure 10C:
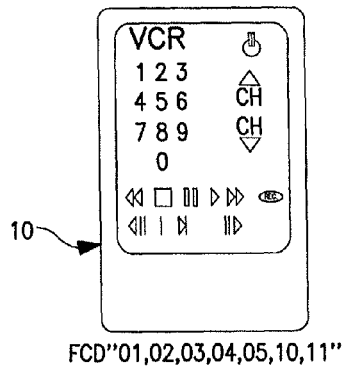
Figure 10D:
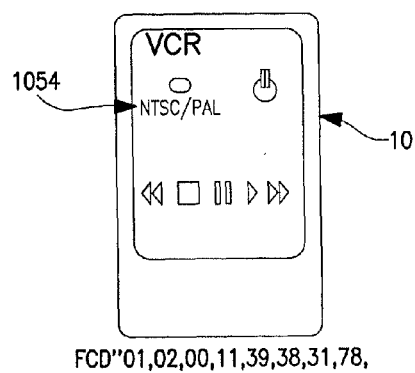

Referring now to FIG. 10a 10d, an example of the uses of the identifiers is illustrated. A simple "playback only" VCR could completely identify its functionality to the remote control 10 by transmitting to the remote control 10 two bytes of data: "01" followed by "02" (see FIG. 10a). If another model of a VCR device additionally featured recording functionality and channel tuner functionality, that model could identify its functional capabilities to the remote control 10 by transmitting a data string "01,02,03,10,11" to the remote control 10 (see FIG. 10b). Another model of a VCR device supporting further still a slow motion function could transmit the data string "01,02,03,04,05,10,11" to the remote control 10 (see FIG. 10c). The remote control is then able to tailor its presentation of function keys (used to command functional operations of the device) to match the exact device being controlled. In keeping with the discussion concerning DAS above, the appropriate user interface elements and signaling information for commanding the remote operation of functions identified in this manner can be retrieved from the built-in database of the remote control 10 or downloaded from a remote location. Furthermore, it is to be understood that there is no ambiguity in assigning the same function number to different functions across devices, since the device type is already known to the remote control as a result of the initial DAS.

FIG. 11 shows an assignment of a number to allow for future expansion and/or addition of new functions not included in the initial function number assignments. As shown in FIG. 11, and as an example, "00" is reserved to indicate that the data following "00" is a definition of a new code and function. So, for example, if a VCR device were a dual format deck which allowed the user to switch between playing tapes recorded in NTSC and PAL formats, it might define a "format switching" function to the remote control by sending the following data to the remote control 10 (see FIG. 10d):

"01,02,00,11,39,38,31,78,84,83,67,47,80,65,76" where:

| | |
|---|---|
| "01, 02" | represents the basic functionality of the unit, as before (power plus transport key group only); |
| "00" | represents the start of the special function definition sequence; |
| "11" | is the number of bytes of data following; |
| "39, 38, 31" | is an ASCII representation of the infrared key data as disclosed in U.S. Pat. No. 5,515,052. This value is a numeric representation of the IR code to be transmitted, (981 in this case); and |
| "78, 84, 83, 67, 47, 80, 65, 76" | is the ASCII representation of the key label to be used when displaying the function key 1054, ("NTSC/PAL" in this case) the activation of which transmits the function command. |

Besides "00," one other special character—the value "255" is reserved. This is used for packet formatting purposes and will be described further below.

To effect function setup within the remote control 10, the 8-bit system identification value from the DAS data is examined. Returning to FIG. 7, if the identification value indicates that the transmitting device does not support the extensions described herein (i.e., is not "CC" in the example given), the remote control 10 setup is complete and the remote control 10 resumes normal operation. If, however, the system identification value indicates that the device supports functional capability reporting then the remote control continues the setup procedure by requesting from the device its FCD data string. This request will usually take the form of a single specific remote control command (i.e., the equivalent of a key press) sent to the target device using the communication format recognized by the target device (i.e., the format established during the DAS process). By agreement with the manufacturer of that device, that particular command will be recognized by the target device as a request to transmit to the remote control 10 FCD of the form described above.

Figure 12:
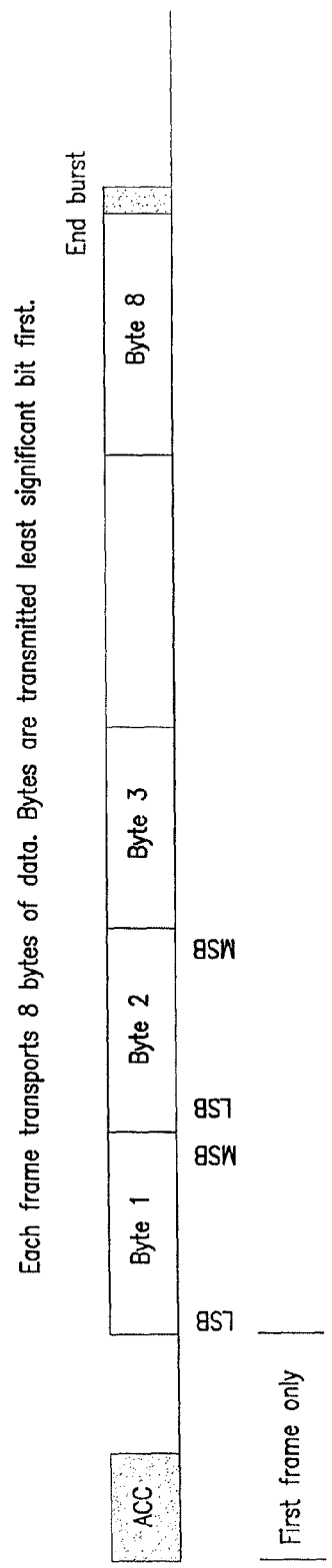
FIG. 12 illustrates an exemplary data frame for transmitting configuration data.

FCD data may be transmitted from the device to the remote control 10 using a variant of the DAS protocol described above. For example, the FCD data may be divided into eight-byte blocks as illustrated in FIG. 12. The final block may be padded as necessary with FF ("255") values to bring it to exactly eight bytes. An eight byte header block is then constructed as follows:

| | |
|---|---|
| 1 byte | Length (represents the number of 8-byte blocks present of header (to allow for future expansion, currently fixed at 1)) |
| 1 byte | Length of data to follow (excluding header block) |
| 2 byte | Data checksum (calculated across all bytes of data, including pad bytes but excluding header) |
| 3 bytes | Reserved for future expansion |
| 1 byte | Header checksum (calculated across the seven preceding bytes) |

It has been found preferable that this data and the DAS data use the same transmit and receive hardware, i.e., carrier frequency and pulse timing. However, for some applications it is preferable to utilize separate transmit and receive hardware.

Figure 7:
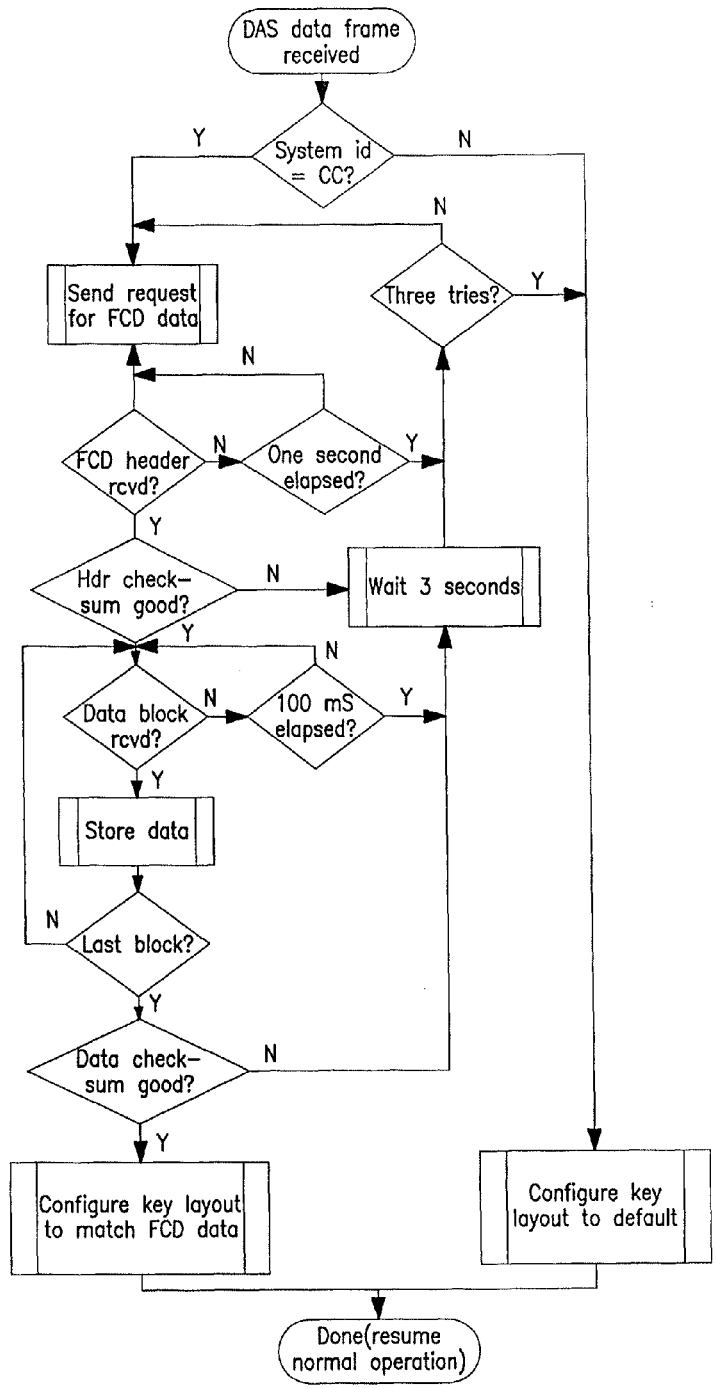
FIG. 7 is a flow chart diagram of an exemplary method to configure capabilities and key layouts of the remote control.

As indicated in the flowchart of FIG. 7, if the remote control 10 receives the FCD data successfully, it configures itself as appropriate for operation of that device. If for any reason the data is not received successfully (e.g., truncated number of packets, bad checksum(s), etc.) the remote control 10 will wait an appropriate period of time and then repeat the request. If after three such attempts the data has still not been obtained, the remote control 10 may abort the process and revert to default operation—usually, supporting the maximum set of possible functions for that device type. While the described embodiment and example transactions assume that the DAS and FCD acquisition occur together, there is nothing that prevents the remote control 10 from issuing a request for data at any time. Thus, the remote control 10 could avail itself of data at any time. Furthermore, FCD data may be obtained from a location other than the device itself, such as a local PC database or a remote Web server and downloaded into the remote control.

To additionally assist in configuring the remote control 10, it is contemplated that the remote control system can be adapted to utilize one or more of various standards that are being proposed which standards are intended to provide uniform methods of digital interconnection between devices. These standards generally specify not only how to transfer audio video source materials, but also how to effect the exchange of control functions between devices, since it is relatively easy to interleave these different signals on a single interface when they are encoded at the digital level. An example of such a standard is the Home Audio Video interoperability (HAVi) architecture specification proposed by a group of major device manufacturers. Another standard which specifies how control function are exchanged between devices is Universal Plug and Play (UPnP). The methods disclosed herein are applicable generally, to these and other such standards that determine parameter passing and interaction between devices. Present suggested standards disclose methods that are not only directed to home entertainment devices, but are also applicable to other devices in the home such as the control of lighting, personal computers, security, communications, sprinklers and other convenience items.

In general, such standards allow control information to be transferred between devices using two methodologies. The first methodology involves predefining a set of standardized commands for each appliance type (such as play/stop/pause for a VCR, channel change for a TV tuner, etc.). Since not all devices necessarily support all possible commands (e.g., a VCR may not support "indexed skip") provision may be made for an appliance to enumerate its capabilities in response to a query from another device on the bus in the form of a list of which standard functions are or are not supported by the appliance. The controlling device (e.g., remote control) uses this information to determine the look and feel of the user interface and the controlled device simply accepts commands from the controlling device.

The second method allows the target device to specify to the controlling device a complete user interface, including the exact icons to display for each function, labels for functions, data and status displays, etc. The controlling device simply presents these to the user and reports back to the controlled device which icon was selected. In other words, unlike the first method, in this scheme the controlled device determines the look and feel of the user interface and the controlling device simply acts as intermediary between the controlled device and the user. It is to be understood that different standards may support either or both of these described methods.

With appliances compliant with such standards, a remote control 10 of the type described herein can be utilized by providing an adapter device that attaches to the digital bus interconnecting these appliances and which solicits capability information from appliances on the bus for transfer to the remote control 10. By way of example, communications from the adapter to the remote control 10 may be via a two-way communication link. Thus, a single standard compatible adapter can provide remote configuration services for all devices connected to the bus, instead of each device individually supplying its DAS data directly to the remote control 10. The remote control 10 can issue user commands to a device either by relaying them back through this same adapter or by communicating directly with the device, whichever is best supported by the device in question. The adapter can be either a "stand alone" unit or incorporated within some other device (e.g., a cable set top box).

Figure 18:
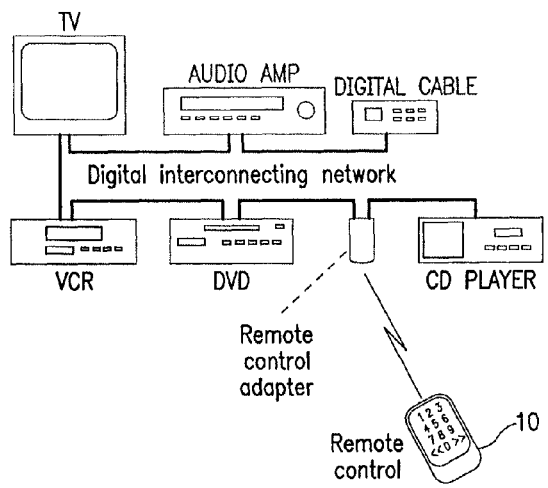

As an illustrative example, an LCD based remote control 10, shown in FIG. 18, can download configuration information from multiple consumer devices which are interconnected via a digital network as described above. Such a remote control 10, which includes a graphic LCD display and touch screen input capability, would be capable of supporting both types of command structure. The remote control 10 would, therefore, represent an extremely powerful user interface device, essentially becoming an extension of the controlled device in the user's hand. Also, since the standard being used may allow an ongoing two-way dialog between the controlled and controlling devices, the remote control display and configuration may be updated dynamically during use of the system; not just at setup time as is the case with the basic "extended DAS" transaction described earlier.

Figure 19:
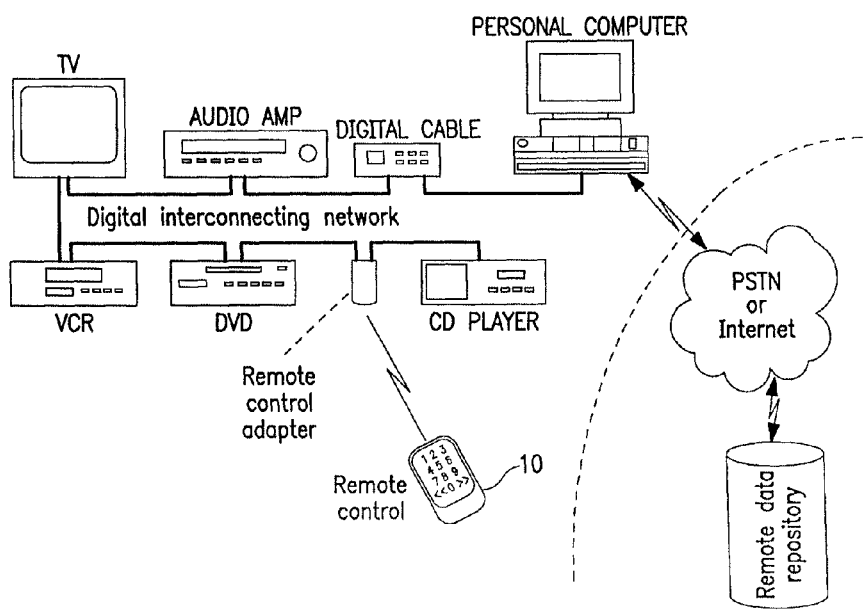

Since devices other than pure entertainment equipment may also share this network, it will be appreciated that it may not be necessary that the entire information set utilized to configure the remote control 10 to work with the equipment be available locally from the equipment itself. For example, devices such as personal computers and the like which have communication capabilities that extend beyond the home may be attached to the network, as illustrated in FIG. 19. In this case, provided that the minimum data required to identify a device type and model can be obtained via DAS, direct user input, or the like, the remote control 10 may use the personal computer as a intermediate client to access a remote data repository and obtain from the remote data repository a complete set of capability and configuration data necessary to configure the remote control 10 to control the consumer's equipment.

To reduce the complexity of the user interface of the remote control 10 resulting from the configuration methods described herein, the system may be adapted to display only function indicators corresponding to respective functions to be controlled from the listing of controllable functions of the device to be controlled. Referring to FIG. 10*a*, the remote control 10 shows function indicators comprising a rewind icon 1038, a stop icon 1040, a pause icon 1042, a play icon 1044, and a fast forward icon 1046. Since these are the only functions desired to be controlled, for example, with this particular VCR, the user is presented with a remote control 10 having substantially reduced apparent complexity. This eases the user's selectivity by reducing extraneous information.

It will be understood that the listing of controllable functions may also be divided into a plurality of families and the single set of function indicators may be divided into a corresponding plurality of families. Accordingly, the step of displaying the graphical user interface elements may include displaying only the family of indicators corresponding to the family of functions to be controlled. For example, the indicators 1036 of FIG. 10*b* have been divided into a channel tuning family 1050 and a tape transport control family 1052.

Figure 13:
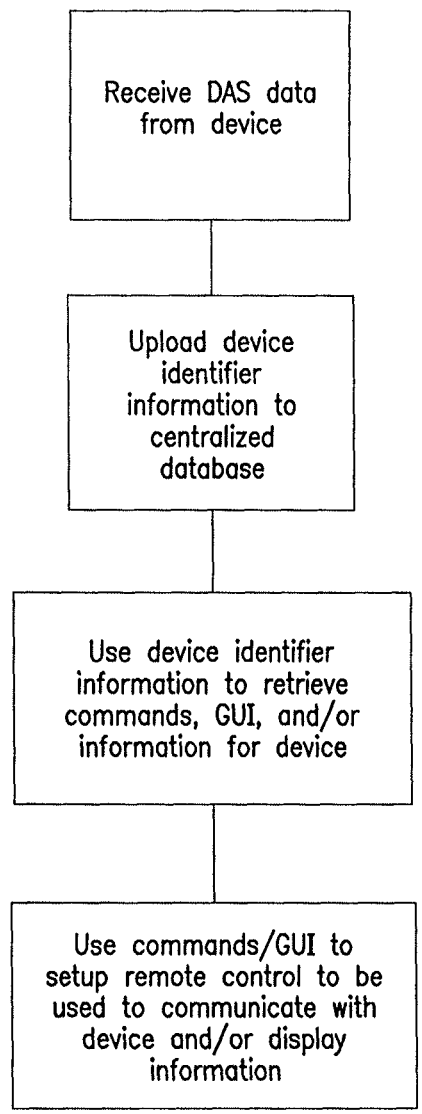
FIG. 13 illustrates an exemplary method for retrieving device information from a centralized device database for use in the remote control.

As discussed above, device and function identity information, whether included in a DAS transmission, read from a barcode label (as described in U.S. Pat. No. 6,225,938), entered by the consumer as a UPC or other code, etc. may, in turn, be used to directly access information stored in a centralized device database that contains definitions necessary to configure the remote control 10 to communicate with and/or control the identified device generally and/or specific functions of the identified device. To this end, the centralized device database may include control codes for devices of different types and manufacturers (and sometime model number) as well as elements of graphical user interface layouts to be displayed by the remote control 10 as an interface to communicate with/control various devices. As illustrated in FIG. 13, the remote control 10 can access the centralized device database server, provide the centralized device database server with the device and/or function identity information, and request that the centralized device database server download to the remote control 10 information from the centralized device database needed by the remote control 10 to configure itself to communicate with and/or control the device corresponding to the device identity and/or function identity information. As will be described in greater detail hereinafter, the centralized device database may also store information relevant to the operation of devices such as user manuals, TV-guide listings, etc. Additionally, the identity information provided to the centralized device database server can be used to provide services such as automatic warranty registration, capturing of demographics (e.g., identifying devices a user owns/has previously setup), etc.

The identity information, whether received via a unidirectional or bi-directional DAS communication, barcode label, or the like, is preferably stored in the memory 34 of the remote control 10. This information may be then be read from the memory 34 and communicated to the centralized device database server 300 during an on-line communications session. Alternatively, the device identity information may be uploaded from the remote control 10 into an intermediate client device 302, such as a personal computer, set top box, etc. for future off-line communication to the centralized device database server 300. Similarly, the information/data returned from the centralized device database for use in the remote control 10 can be loaded into the memory 34 of the remote control 10 during an on-line communications session or this information/data can be downloaded to the intermediate device 302 for subsequent, off-line downloading into the memory 34 of the remote control 10.

Figure 14:
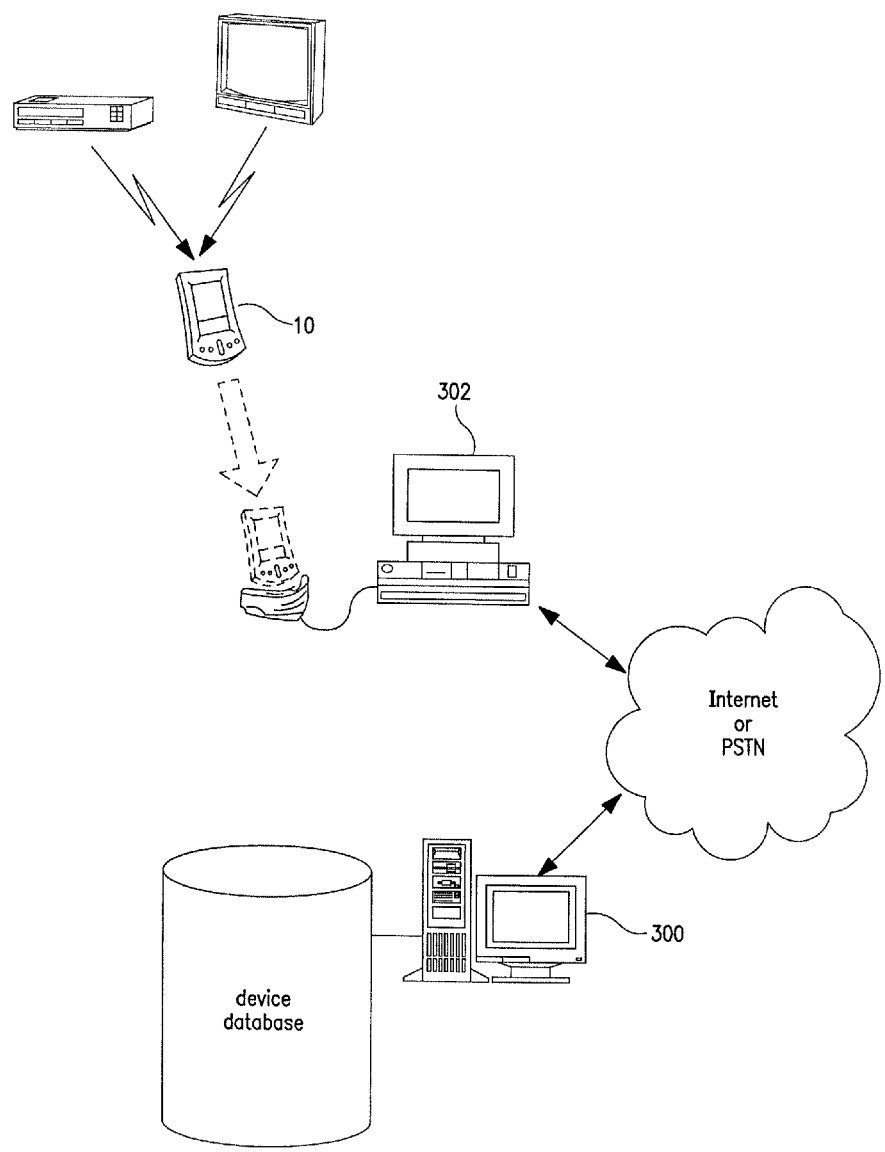
FIGS. 14-19 illustrate exemplary systems and networks in which the principles of the invention may be employed.
Figure 15:
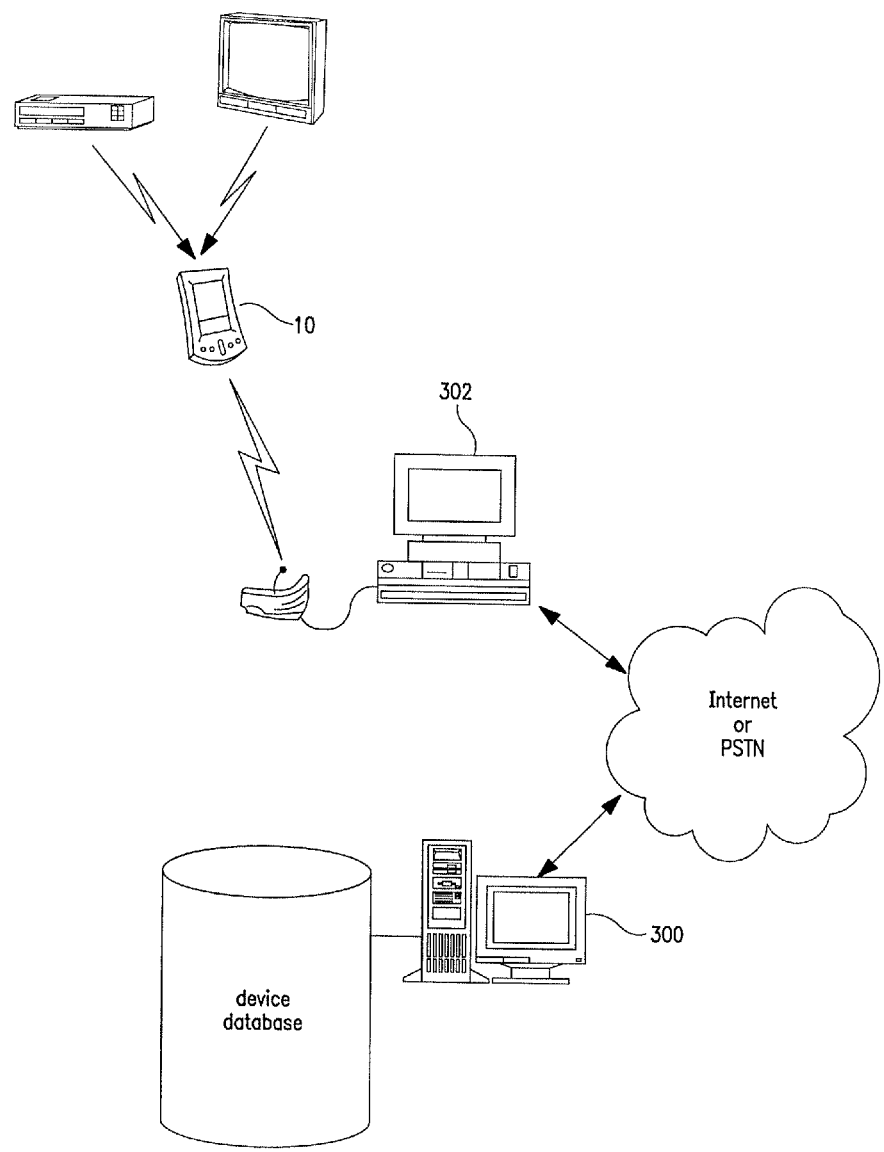
Figure 16:
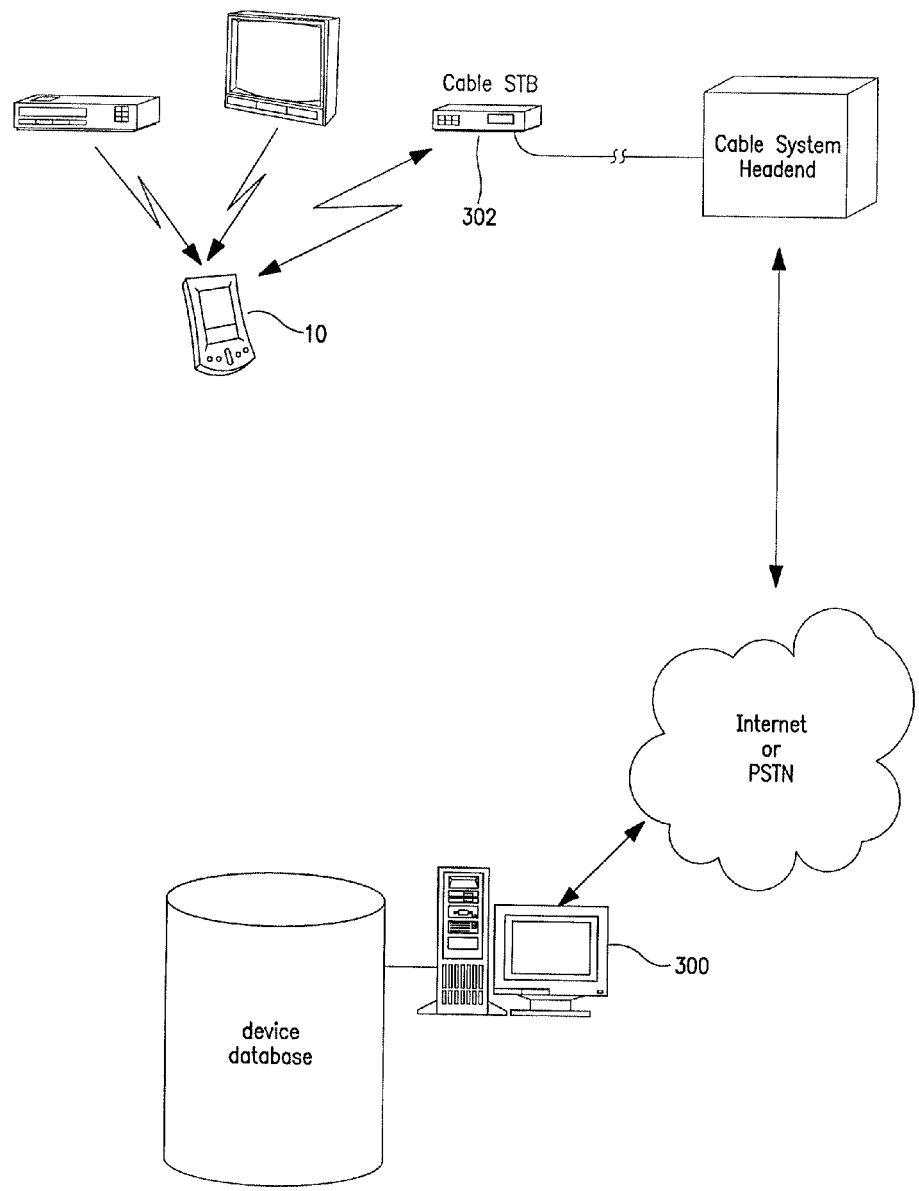
Figure 17:
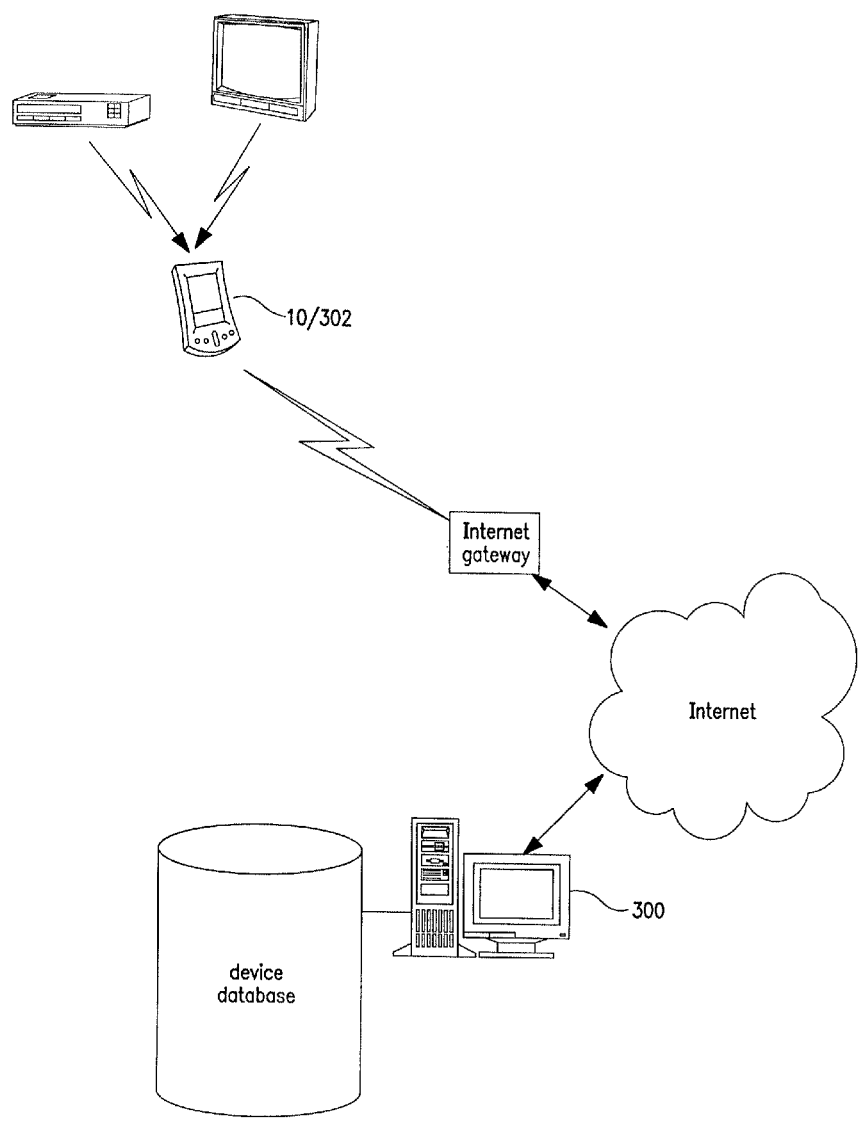

To upload the identity information to the centralized device database server 300, as illustrated in FIG. 14 17, the remote control 10 is first placed in communication with a client device 302 which, in turn, is capable of communicating with and accessing the centralized device database server 300. Access to the centralized device database server 300 may be via direct connection or via the Internet, PSTN, or other network. By way of example, the client device 302 can be a personal computer as illustrated in FIGS. 14 and 15 or a cable set top box as illustrated in FIG. 16. Still further, the client device 302 can itself be the remote control, as illustrated in FIG. 17, when the remote control functionality is embodied in a PDA, Webpad, personal computer or the like. Communications with the client 302 can be by means of a docking device 304, as illustrated in FIG. 14, or by means of RF wireless communications, using protocols such as 802.11b, Bluetooth, etc., as illustrated in FIG. 15. Still further, communications with the client 302 can be accomplished using bi-directional IR transmissions, as illustrated in FIG. 16.

To communicate with the centralized device database server 300, the client device 302 can include software that is designed to monitor for data messages from the remote control 10 and initiate contact with the centralized database server 300 when the remote control 10 indicates that it possesses a new device or function identity. Preferably, this software runs in a background mode. The software can be responsive to a transmission from the remote control 10 which notifies the software of the fact that the remote control 10 includes new identity information. This notification can include data representative of the new device or function identity or the software can request that the new device or function identity be supplied in a further transmission. Still further, the software can periodically read the memory of the remote control 10 to determine if there has been a change in the device identity data stored in memory 34. This is especially useful in the case where the remote control is a PDA or PDA-like device, as is possible in the examples shown in FIG. 14 or 15, where the software could form part of the synchronization process which is automatically invoked whenever the portable device is docked or otherwise establishes communication with the host PC. A similar arrangement may be used in the case of a remote control which is equipped to display TV guide information (as described, for example, in co-pending U.S. application Ser. No. 09/905,396 or in U.S. Pat. No. 6,130,726) wherein the remote control 10 engages in periodic communication with a PC client device 302 in order to refresh guide data. In cases where the client device 302 is not a PC but is a cable or satellite set top box, home gateway appliance or the like, an embedded application may be installed in the device to perform in a similar manner.

Upon receipt of the identity information from the remote control 10, the centralized device database server 300 uses the identity information to select from a command code library stored in the centralized device database one or more command codes and transmission formats recognizable and appropriate for the identified device and/or function. This data is then returned from the centralized database server 300 to the client device 302 whence it may be transferred directly back to the remote control 10 if the remote control is still in communication with the client device 302. Alternatively, the data may be stored on the client device 302 for later transfer to the memory of the remote control 10 during a subsequent docking or communication session with the remote control 10. Once the data is transferred to the remote control 10 the data is used in a manner well known to those of skill in the art to setup the remote control 10 to control the operation of the device and/or the identified function.

In addition, the centralized device database server 300 may also use the device and/or function identity information to retrieve from the centralized device database graphical user interface elements, such as command key representations and layouts, that are appropriate for the identified device and/or function. The graphical user interface elements may then be downloaded as described above to the remote control 10 for use in providing a display by which the user can command the operation of the device. The graphical user interface elements can be embodied in an XHTML file or the like to be displayed using browser software resident on the remote control 10 as described in U.S. application Ser. Nos. 60/264,767, 09/905, 423, 09/905,432, and Ser. No. 09/905,396. Still further, the graphical user interface elements may be in a proprietary format compatible with specific remote control application software such as described in co-pending U.S. Patent Applications 60/344,020 and 60/334,774. Importantly, from an equipment manufacturer's point of view, offering downloadable graphical user interface elements in this manner allows the manufacturer to retain a degree of control over the "look and feel" of their device's remote control user interface, even when used with aftermarket LCD remote controls.

The centralized database server 300 may also be used to provide other information relevant to the operation of devices to the benefit of the consumer and/or device manufacturer. For example, device specific reference documentation such as user manuals, hook-up instructions, FAQs, and the like may be stored at the centralized database server and downloaded to the client device or remote control 10 according to the device identity information provided to the centralized database server 300. This additional information may be provided either as part of an initial setup procedure or at some later point by explicit user request. Alternatively, in cases where the remote control 10 is capable of wireless communication with the client device or directly to the server 300 (as shown, for example in FIG. 15 17) reference information can be offered interactively using, for example, the techniques described in co-pending U.S. application Ser. No. 09/905, 423.

Another application that may be supported by such a centralized server 300 is warranty registration. Since a remote control 10 can be expected to access the centralized database shortly after the consumer has purchased a device, warranty registration can be advantageously performed in conjunction with the database access made to setup the remote control 10 to communicate with/control the device. Depending upon the manufacturer, warranty registration may be partially or fully automated. For example, the device identity data supplied to the remote control 10 by the device may be extended to include a serial number that, in turn, can be communicated to the centralized server 300. The user may then be requested to enter his personal information to complete the registration process. In cases where the remote control function is implemented within a PDA device, which may already contain the user information, the retrieval of the personal information can also be made fully automatic using well known retrieval techniques.

In addition to warranty registrations, consumer demographic information may also be captured as part of the processes described herein. In this regard, the remote control 10 knows what other devices the consumer owns by virtue of the remote control 10 having been set up to control those devices. Accordingly, this information can be accumulated at the centralized server 300 for analysis. For example, answers to marketing research questions such as "How many purchasers of Sony DVD players also own a PVR?" and "What proportion of owned PVRs are Sony branded?" could be extracted from a such a data accumulation.

Since the centralized device database inherently includes elements which infer the functionality of individual device brands and models (i.e., the remote control command set for each of them) another service that could be offered to the consumer through the server may be the ability to research feature sets of devices of different manufacturers prior to purchasing a device. For example, a consumer may access the centralized database and inquire "Which PVR models have dual tuners?" or "Which Panasonic TVs support picture-in-picture."

Another feature that a manufacturer may wish to offer through the centralized server 300 is providing customers with information regarding the availability of accessories, supplies, and add-on equipment. Advantageously, the centralized server 300 can be used to prepare sales catalog listings that could be tailored to a particular device type and model using the device identity and/or serial number information received from the remote control 10. Tailored catalog and purchasing information can be downloaded to the client device 302 or remote control 10 itself for display to and perusal by the consumer. Once this information is presented to a user, either on the display of the remote control 10 or a display associated with a client device, orders can be placed interactively through the centralized server 300 using well known e-commerce principals.

Still further, since consumer electronic devices are designed to allow for upgrade of their internal firmware programming to add future capabilities, updated remote control command code libraries and/or GUI layouts may be provided to the remote control 10 via the centralized device database server to match any upgrades. By way of example, digital cable or satellite set-top boxes, PVRs, and the like can have their capabilities updated from a remote location without any significant involvement by the user. In cases where an update to the device functionality is received, the consumer may be prompted to manually initiate a further remote control setup in order to acquire a corresponding command code/GUI update from the centralized device database. Alternatively, the newly-loaded device firmware update could automatically initiate a DAS sequence to, in turn, initiate the setting up of the remote control 10 using one or more of the procedures described herein.

In the case where the remote control uses an LCD or other display and/or a touchscreen to implement the user interface, the information downloaded from the centralized database server 300 would result in a user interface appropriate for the device and the new device functionality with no further action on the user's part. In the case of a remote control with hard keys only, the centralized database server 300 may be used to provide new labeling for the remote control 10. For example, in some embodiments it is contemplated that the manufacturer will build a base remote control 10 having a set of blank, configurable keys and, possibly, basic functions expected to be required by everyone (e.g., volume control keys, digit keys, channel control keys, power). Provision may then be made at the centralized database server 300 to create custom labels for the blank keys in connection with the setup process which can be downloaded and printed on an overlay for use in connection with the remote control 10 to identity to the user the functions to be controlled upon activation of a remote control key.

Still further, once a device is identified to the centralized device database server 300, the customer can be allowed to customize the key configuration and/or graphical user interface of the remote control 10. To this end, the consumer may be presented with one or more screens, showing a virtual representation of the remote control together with a table of all functions available for the device. Using a "drag and drop" interface, for example, the consumer may assign functions to blank keys/iconic locations on the remote control 10. In some cases, users may be presented with iconic layouts for LCD displays that, while user alterable, are preformatted, based on the device ID, so as to have a key layout appearance similar to the original remote control provided by the manufacturer of a device.

When the key layout configuration process is completed by a user, the centralized device database server 300 downloads the configuration into the remote control 10 as described above. In the case where blank hard keys are utilized, the consumer may print a label further provided by the central server 300 to be installed on the remote. In an alternative labeling approach, the central server 300 could transmit the label data to a center where a more durable label, e.g., a mylar overlay, would be pad printed and mailed to the user. Various means for providing labels to the remote control 10 are illustrated in U.S. application Ser. No. 09/615,473.

In yet another embodiment, the user may access the centralized device database to download to the remote control 10 one or more sequences of instructions to perform various operations, otherwise known as macros. For example, a user who has just purchased a new VCR may be able to download preprogrammed macros which facilitate setup and adjustment of a home theater system in which the VCR is inferred to be a part of. In this case, the devices in the home theater system can be inferred from prior device setups performed using the centralized device database. As additional devices are added to the remote control 10, the centralized server can use the device information to make informed decisions regarding the instructions to include in a macro given the devices owned by a user. Alternatively, the user can be presented with one or more screens by which the user can create a custom sequence of macro instructions.

To, in part, avoid overloading memory in the remote control 10, the user can be provided with a memory indicator indicating, preferably on a percent basis, how much memory is available in the remote control 10 for downloading further data/information. Memory usage may be maintained locally or remotely, e.g., at the centralized database server. In another embodiment, the indicator represents the amount of memory the download will use without regard to the amount of data already stored in memory.

While specific embodiments of the present invention have been described in detail, it will be appreciated by those skilled in the art that various modifications and alternatives to those details could be developed in light of the overall teachings of the disclosure. For example, it should be appreciated that any of the above described methods can be used alone or in combination to setup the remote control 10. Additionally, as noted, the functionality of the universal remote control 10 can be included in other devices such as PDAs, personal computers, home devices, or the like. Accordingly, it will be understood that the particular arrangements and procedures disclosed are meant to be illustrative only and not limiting as to the scope of the invention which is to be given the full breadth of the appended claims and any equivalents thereof.

All of the cited patents and patent applications are hereby incorporated by reference in their entirety.

What is claimed is:

1. A method for configuring a controlling device to command the operation of an appliance, comprising:
    receiving into the controlling device data that functions to identify the appliance;
    transferring the data that functions to identify the appliance from the controlling device to a device having Internet connectivity;
    transferring the data that functions to identify the appliance from the device having Internet connectivity via a wide area communication link to an Internet server having access to a database of control codes for commanding the operation of a plurality of appliances of different types and different manufacturers;
    receiving from the Internet server at the device having Internet connectivity via the wide area communication link control codes that were selected from the database of control codes as a function of the data that functions to identify the appliance;
    transferring the control codes received from the Internet server from the device having Internet connectivity to the controlling device; and
    storing the control codes received from the Internet server in the controlling device whereby the control codes are available for use in commanding the operation of the appliance.

2. The method as recited in claim 1, wherein the device having Internet connectivity comprises a personal computer and wherein the step of transferring the data from the controlling device to a device having Internet connectivity is performed in response to the controlling device being placed into communication with the personal computer.

3. The method as recited in claim 2, wherein the step of transferring the data from the controlling device to a device having Internet connectivity is performed in response to the controlling device being synchronized with the personal computer.

4. The method as recited in claim 1, wherein the device having Internet connectivity comprises a personal computer and wherein the step of transferring the control codes received from the Internet server from the device having Internet connectivity to the controlling device is performed in response to the controlling device being placed into communication with the personal computer.

5. The method as recited in claim 4, wherein the step of transferring the control codes received from the Internet server from the device having Internet connectivity into the controlling device is performed in response to the controlling device being synchronized with the personal computer.

6. The method as recited in claim 1, wherein the data that functions to identify the appliance is received into the controlling device via a transmission originating from the appliance.

7. The method as recited in claim 1, wherein the data that functions to identify the appliance is received into the controlling device by being manually entered into the controlling device.

8. The method as recited in claim 1, wherein the data the functions to identify the appliance is received into the controlling device by reading a bar code label with the controlling device.

9. The method as recited in claim 1, wherein the data that functions to identify the appliance is received into the controlling device via a transmission originating from a personal computer.

10. The method as recited in claim 1, wherein the data that functions to identify the appliance is received into the controlling device via a transmission originating from a cable converter box.

11. The method as recited in claim 1, wherein the data that identifies the appliance comprises a serial number for the appliance.

12. The method as recited in claim 1, comprising receiving from the Internet server at the device having Internet connectivity via the wide area network a macro command sequence and transferring the received macro command sequence from the device having Internet connectivity to the controlling device to thereby allow the controlling device to command at least one operation of the appliance in conjunction with at least one operation of another appliance.

13. The method as recited in claim 1, wherein the device having Internet connectivity comprises a set top box.

14. A method for configuring a controlling device to command the operation of a first appliance and a second appliances, comprising:
    receiving into the controlling device first data that functions to identify the first appliance;
    receiving into the controlling device second data that functions to identify the second appliance;
    transferring the first data and the second data from the controlling device to a device having Internet connectivity;
    transferring the first data and the second data from the device having Internet connectivity via a wide area communication link to an Internet server having access to a database of control codes for commanding the operation of a plurality of appliances of different types and different manufacturers;
    receiving from the Internet server at the device having Internet connectivity via the wide area communication link first control codes that were selected from the database of control codes as a function of the data that functions to identify the first appliance, second control codes that were selected from the database of control codes as function of the data that functions to identify the second appliance, and a macro sequence for commanding at least one operation of the first appliance in conjunction with at least one operation of the second appliance;

transferring the first control codes, the second control codes, and the macro sequence from the device having Internet connectivity to the controlling device; and storing the first control codes, the second control codes, and the macro sequence in the controlling device whereby the first control codes, the second control codes, and the macro sequence are available for use in commanding the operation of the first appliance and the second appliance.

15. The method as recited in claim 14, wherein the first data and the second data is received into the controlling device via a transmission originating from the first appliance and the second appliance, respectively.

16. The method as recited in claim 14, wherein the first data and the second data is received into the controlling device by being manually entered into the controlling device.

17. The method as recited in claim 14, wherein the device having Internet connectivity comprises a set top box.

18. The method as recited in claim 14, wherein the device having Internet connectivity comprises a personal computer.

19. A system, comprising:

a controlling device; and a device having internet connectivity adapted to exchange communications with the controlling device, wherein the device having internet connectivity comprises a processing device and an associated memory device on which is stored instructions which, when executed by the processing device, cause the device having internet connectivity to perform steps comprising:

receiving from the controlling device data that functions to identify an appliance;

transferring the data that functions to identify the appliance via a wide area communication link to an Internet server having access to a database of control codes for commanding the operation of a plurality of appliances of different types and different manufacturers;

receiving from the Internet server via the wide area communication link control codes that were selected from the database of control codes as a function of the data that functions to identify the appliance; and transferring the control codes received from the Internet server to the controlling device whereby the control codes are available for use by the controlling device to command the operation of the appliance.

20. The system as recited in claim 19, wherein the device having Internet connectivity comprises a personal computer.

21. The system as recited in claim 19, wherein the device having Internet connectivity comprises a set top box.

22. The system as recited in claim 19, wherein the instructions cause the device having Internet connectivity to receive the data from the controlling device in response to the controlling device being placed into communication with the device having Internet connectivity.

23. The system as recited in claim 19, wherein the instructions cause the device having Internet connectivity to receive the data from the controlling device in response to the controlling device being synchronized with the device having Internet connectivity.

24. The system as recited in claim 19, wherein the instructions receive from the Internet server via the wide area network a macro command sequence and transfer the received macro command sequence to the controlling device to thereby allow the controlling device to command at least one operation of the appliance in conjunction with at least one operation of another appliance.

* * * * *